Feb. 4, 1936.  A. D. MACALLUM  2,029,826
DEHYDRATION OF SOLUTIONS
Filed May 4, 1931
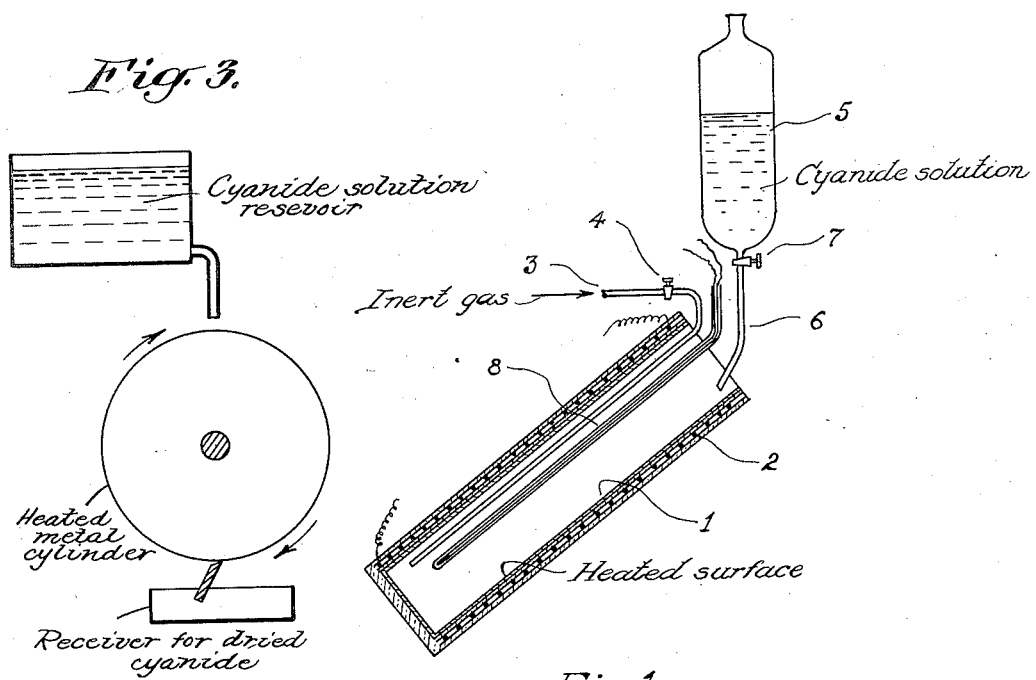
Fig. 3.
Fig. 1.
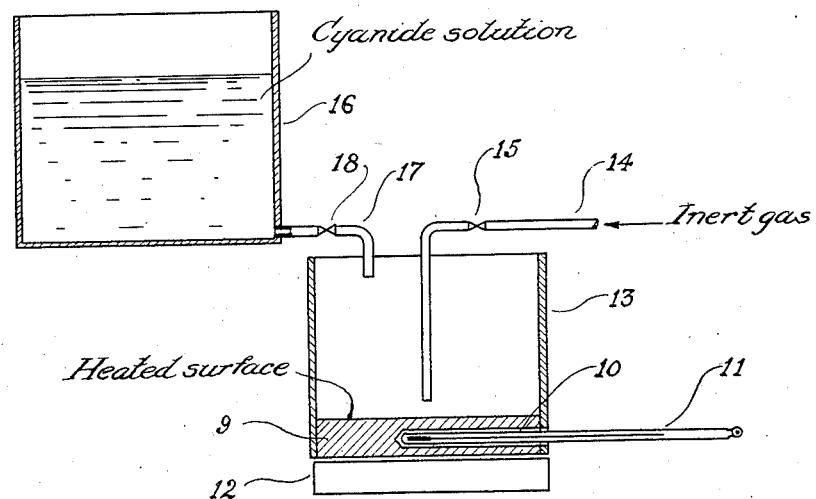
Fig. 2.
INVENTOR.
A. Douglas Macallum.
BY
Paul M. Paulson
ATTORNEY.

Patented Feb. 4, 1936

2,029,826

UNITED STATES PATENT OFFICE 2,029,826

DEHYDRATION OF SOLUTIONS

Alexander Douglas Macallum, Niagara Falls, N. Y., assignor, by mesne assignments, to E. I. du Pont de Nemours and Company, a corporation of Delaware Application May 4, 1931, Serial No. 535,006

12 Claims. (Cl. 23—84)

This invention relates to the evaporation of solutions relatively unstable to heat and more particularly to the evaporation of cyanide solutions.

The evaporation of cyanide solutions to obtain a solid product of high purity is usually difficult because of the tendency of such solutions to decompose, hydrolyze or react with constituents of the atmosphere at elevated temperatures. Heretofore, it has been necessary to evaporate such solutions at relatively low temperatures. An example is the production of anhydrous sodium cyanide from its aqueous solutions. One method comprises low-temperature crystallization of the hydrate ($NaCN.2H_2O$) and subsequent dehydration of the hydrated salt either by fusion at a low temperature or by heating at low temperatures either in vacuo or in $CO_2$-free air. The anhydrous salt has also been produced from its solutions by simple evaporation and by spray evaporation in vacuo. The crystallization method is slow and does not consistently produce a pure salt. The vacuum distillation methods require expensive equipment and involve high operating costs.

An object of this invention is to provide a simple and relatively inexpensive process for evaporation of cyanide solutions. A more specific object is to provide a means for substantially completely dehydrating cyanide solutions, without material decomposition and at relatively small expense. Other objects will be hereinafter apparent.

These objects are accomplished by heating the solution above its boiling point within a very short period of time and providing means to carry off the water vapor as fast as formed.

The drawing is a diagrammatic representation of three devices suitable for carrying out my invention. In Figure 1, 1 represents an inclined cylinder surrounded by a heating element 2, which consists of a resistance coil embedded in insulating material; for cyanide solutions the drying cylinder 1 may be of steel. Tube 3 is arranged to conduct gas to a point near the bottom of the cylinder 1 and is fitted with regulating valve 4. 5 represents a liquid reservoir, to which is attached tube 6 with regulating valve 7 for conducting liquid into cylinder 1. 8 represents a thermocouple element.

In Figure 2, 9 represents a rectangular steel block having a horizontal thermometer well 10 extending to about the center of the block, containing thermometer 11. Walls 13, made of heat resisting material, enclose the block on all sides. Tube 14 is arranged to conduct gas to a point near the center of the surface of block 9 and is fitted with a regulating valve 15. Tube 17, which is adapted to introduce liquid within the space formed by the walls 13, is fitted with regulating valve 18 and is connected to the liquid reservoir 16. 12 represents an electrical heating element.

Fig. 3 represents another apparatus for carrying out my invention embodying a heated metal cylinder and scraper. The different parts of this apparatus schematically shown in the figure, are represented by appropriate legends.

I have discovered that cyanide solutions may be evaporated substantially to dryness at elevated temperatures and atmospheric pressure, with little or no decomposition, providing the solution is brought very quickly to the evaporation temperature and quickly evaporated. I may employ any known method for accomplishing this, for instance, a stream of the solution may be contacted with a heated surface, or the solution may be sprayed into a hot gas. Whatever method is used, the stream of solution at a temperature below that at which material decomposition occurs is brought suddenly in contact with the heating means which is maintained at a temperature above the boiling point of the solution. The process may be operated at or near atmospheric pressure.

It is usually desirable to provide a flow of gas across or through the place where the evaporation occurs. This serves to remove the water vapor to aid in the rapidity of the evaporation. When the residue of evaporation would be injured by certain gases, this inert gas circulation can be used to prevent undesirable constituents from coming in contact with the material. Thus an inert gas such as nitrogen could be used to prevent undesirable air constituents such as carbon dioxide from coming in contact with hot cyanide residue in evaporation of sodium cyanide solutions. Any gas or vapor that is substantially chemically inert to the cyanide under the conditions of the reaction may be used. If desired, the gas may be preheated.

One method of carrying out my invention will be described with reference to Figure 1 of the drawing. Cylinder 1 is heated by means of element 2 and a current of gas is allowed to flow in by way of tube 3. Reservoir 5 is filled with sodium cyanide solution, which is introduced into cylinder 1 by way of tube 6. The temperature of evaporation is observed by means of thermocouple 8 and suitable attachments thereto. The amount of heat supplied, the flow of gas and the flow of solution are so adjusted that the rate of evaporation is approximately equal to the rate of flow of the solution. Preferably, conditions are so maintained that there is substantially no accumulation of liquid in the cylinder 1 at any time. Obviously, the maximum permissible rate of flow of cyanide solution depends on the amount of heat supplied, the rate of flow of gas, and other factors such as the shape and size of the evaporating surface. In general, the maximum flow of liquid may vary directly with the amount of heat supplied and the flow of gas. The temperature is preferably maintained at between 200° C. and 400° C. I have operated the process at temperatures as high as 426° C. and as low as 130° C. with satisfactory results, and possibly a still wider temperature range might be operative. However, at temperatures below 200° C. the evaporation is ordinarily too slow for practical purposes and it is difficult to obtain a product with a high cyanide content. Temperatures above 400° C. are in general impracticable because of the expense and difficulty in constructing equipment to withstand high temperatures and because of the explosive effect of contacting a cold solution with an exceedingly hot surface.

Example 1

Sodium cyanide solution was evaporated by the above described process in the apparatus shown in Figure 1. The cylinder 1 was 2 inches in diameter by 12 inches long and was inclined at angle of 45°. $CO_2$-free air was passed in through tube 3 at a constant rate of about 200 cc. per minute. A 22.3% aqueous solution of sodium cyanide, made by dissolving a cyanide containing approximately 96.2% NaCN, was run into the cylinder 1 at a rate of about 1 gram per minute, while the temperature as indicated by the thermocouple 8 was maintained at 370–380° C. When 45 grams of solution had been evaporated, the apparatus was cooled and the solid cyanide removed, weighed and analyzed. The solid cyanide was substantially anhydrous and contained 92.2% of NaCN. The yield was 91.3%; the loss appeared to be chiefly due to the gas stream which carried out fine particles.

The operation of the evaporator shown in Figure 2 is carried out similarly to that described above. The block 9 is heated by the heating element 12. Gas is introduced into the evaporation chamber by means of tube 14 and cyanide solution is brought in by way of tube 17.

Example 2

A series of evaporations was carried out in an apparatus such as shown in Figure 2, using a 25% aqueous solution of 96.3% sodium cyanide. The gas used was substantially pure nitrogen. The product of each run was removed and analyzed for NaCN. The operating conditions and the results are given in the following table:

| Run | Temperature (°C.) | Nitrogen flow (cc./min.) | Rate of flow of solution (cc./min.) | Percent NaCN in product |
|---|---|---|---|---|
| 1 | 127 | 200 | 0.20 | 78.5 |
| 2 | 130 | 200 | 0.20 | 89.0 |
| 3 | 135 | 200 | 0.20 | 88.4–89.6 |
| 4 | 150 | 200 | 0.20 | 91.9–92.9 |
| 5 | 175 | 200 | 0.36 | 92.1 |
| 6 | 200 | 200 | 0.44 | 95.7 |
| 7 | 384 | 200 | 0.66 | 96.3 |

The above described methods of carrying out my process have been given by way of example and my invention is not limited thereto. The rates of flow of gas and liquid may be varied considerably, as long as the rate of evaporation is maintained at substantially not less than the rate of liquid flow. As stated and shown, there is a minimum and a maximum temperature for satisfactory operation. These temperatures will vary with the type of apparatus, rate of gas flow and the purity desired in the product. Many variations in the process and apparatus will be apparent to skilled persons. For example, the process may be operated in a continuous manner by use of a moving evaporation surface or other means for continuous removal of product. The apparatus used may be constructed of ceramic materials or of metal, depending on the specific conditions to be met.

My invention has the advantages of producing anhydrous cyanide of high purity in a single step from its solutions; it can be carried out effectively with comparatively simple apparatus, and it can be adapted for continuous recovery of solid cyanides from solutions.

By my process, cyanide solutions, for example solutions of alkali metal cyanides, may be evaporated without material decomposition even though the temperature and concentration conditions are such that the temperature of the evaporating cyanide solution is above the temperature at which decomposition and hydrolysis normally occur, e. g. 70° C. The anhydrous salt may be made without recourse to the prior multiple-step and relatively expensive methods. Obviously, the process may be applied to the dehydration of various other aqueous solutions which tend to decompose at or near their boiling points.

What is claimed is,

1. A process for evaporating an aqueous solution of a substance which tends to hydrolyze at elevated temperatures, comprising bringing said solution into contact with a heating means maintained at a temperature above the boiling point of said solution at such rate that said solution is substantially instantaneously evaporated to dryness before substantial decomposition of said substance occurs and the pressure during the evaporation being such that the temperature of the evaporating solution is maintained above the temperature at which substantial hydrolysis would normally occur.

2. A process for evaporating an aqueous solution of a substance which tends to hydrolyze at elevated temperatures comprising flowing said solution onto a heated surface at a temperature above the boiling point of said solution at such rate that said solution is substantially instantaneously evaporated to dryness and in such manner that the resulting solid material is deposited on said heated surface and the pressure during the evaporation being such that the temperature of the evaporating solution is maintained above the temperature at which substantial hydrolysis would normally occur.

3. A process for evaporating an aqueous solution of an alkali metal cyanide comprising bringing said solution into contact with a heating means maintained at a temperature above the boiling point of said solution at such rate that said solution is substantially instantaneously evaporated to dryness before substantial decomposition of cyanide occurs and the pressure during the evaporation being such that the temperature of the evaporating solution is maintained above the temperature at which substantial hydrolysis would normally occur.

4. A process for evaporating an aqueous solution of an alkali metal cyanide comprising depositing said solution on a heated surface maintained at a temperature above the boiling point of said solution at such rate that said solution is substantially instantaneously evaporated to dryness and in such manner that the resulting solid cyanide is deposited on said heated surface and the pressure during the evaporation being such that the temperature of the evaporating solution is maintained above the temperature at which substantial hydrolysis would normally occur.

5. A process for evaporating an aqueous solution of an alkali metal cyanide comprising flowing said solution onto a heated surface maintained at a temperature above the boiling point of said solution at such rate that said solution is substantially instantaneously evaporated to dryness before substantial decomposition of cyanide occurs, the pressure being maintained at substantially atmospheric pressure during the evaporation of said solution and the evaporation being carried out in such manner that the resulting solid cyanide is deposited on said heated surface.

6. A process for evaporating an aqueous solution of an alkali metal cyanide comprising flowing said solution onto a heated surface maintained at a temperature of 200–400° C. at such rate that said solution is substantially instantaneously evaporated to dryness before substantial decomposition of cyanide occurs.

7. A process for evaporating an aqueous solution of sodium cyanide comprising depositing said solution on a heated surface maintained at a temperature above the boiling point of said solution at such rate that said solution is substantially instantaneously evaporated to dryness before substantial decomposition of cyanide occurs and the pressure during the evaporation being such that the temperature of the evaporating solution is maintained above the temperature at which substantial hydrolysis would normally occur.

8. A process for evaporating an aqueous solution of sodium cyanide comprising flowing said solution onto a heated surface maintained at a temperature of 200–400° C. at such rate that said solution is substantially instantaneously evaporated to dryness and in such manner that the resulting solid cyanide is deposited on said surface.

9. A process for evaporating an aqueous solution of a substance which tends to hydrolyze at elevated temperatures comprising flowing said solution onto a heated surface maintained at a temperature above the boiling point of said solution at such rate that said solution is substantially instantaneously evaporated to dryness and in such manner that the resulting solid is deposited on said surface, simultaneously flowing an inert gas over said heated surface and removing solid material from said surface.

10. A process for evaporating an aqueous solution of an alkali metal cyanide comprising flowing said solution onto a heated surface maintained at a temperature above the boiling point of said solution at such rate that said solution is substantially instantaneously evaporated to dryness before substantial decomposition of said alkali metal cyanide has occurred and in such manner that the resulting solid is deposited on said surface and simultaneously flowing an inert gas over said surface.

11. A process for evaporating an aqueous solution of an alkali metal cyanide comprising depositing said solution onto a heated surface maintained at a temperature above the boiling point of said solution at such rate that said solution is substantially instantaneously evaporated to dryness before substantial decomposition of cyanide occurs and simultaneously flowing a carbon dioxide-free gas over said heated surface.

12. A process for evaporating an aqueous solution of sodium cyanide comprising flowing said solution onto a heated surface maintained at a temperature of 200–400° C. at such rate that said solution is substantially instantaneously evaporated to dryness before substantial decomposition of cyanide occurs and in such manner that the resulting solid cyanide is deposited on said surface and simultaneously flowing nitrogen over said surface.

A. DOUGLAS MACALLUM.